(12) United States Patent
Fidan et al.

(10) Patent No.: US 7,878,582 B2
(45) Date of Patent: Feb. 1, 2011

(54) DRIVE FOR MOVING A WIND DEFLECTOR ON A CABRIOLET

(75) Inventors: Serkan Fidan, Sindelfingen (DE); Bernd Plocher, Rottenburg (DE); Daniel Seifert, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/301,406

(22) PCT Filed: Apr. 28, 2007

(86) PCT No.: PCT/EP2007/003790
§ 371 (c)(1), (2), (4) Date: May 6, 2009

(87) PCT Pub. No.: WO2007/134700
PCT Pub. Date: Nov. 29, 2007

(65) Prior Publication Data
US 2009/0295191 A1 Dec. 3, 2009

(30) Foreign Application Priority Data
Sep. 15, 2006 (DE) .................. 10 2006 023 912

(51) Int. Cl.
*B60J 7/22* (2006.01)
(52) U.S. Cl. .................................... 296/217
(58) Field of Classification Search ............ 296/217, 296/180.1–180.5
See application file for complete search history.

(56) References Cited

U.S. PATENT DOCUMENTS

| 3,328,074 A | 6/1967 | Rossem |
| 3,727,973 A | 4/1973 | Perks |
| 6,164,717 A * | 12/2000 | Haagen ............... 296/217 |
| 2004/0256885 A1 | 12/2004 | Bui |

FOREIGN PATENT DOCUMENTS

| DE | 3833046 A1 | 4/1990 |
| DE | 10 2004 017 642 A1 | 10/2005 |
| DE | 10 2004 027 087 A1 | 12/2005 |
| EP | 0 895 889 A2 | 2/1999 |

OTHER PUBLICATIONS

International Search Report dated Jul. 19, 2007 with an English translation of the pertinent portions (Five (5) pages).

* cited by examiner

*Primary Examiner*—Dennis H Pedder
(74) *Attorney, Agent, or Firm*—Crowell & Moring LLP

(57) ABSTRACT

A drive for moving a lamella of a wind deflector is provided. The drive includes at least one coupling mechanism by which the lamella can be adjusted from a non-use position into a use position and vice versa. The mechanism is articulatedly connected at one end to the lamella and at the other end to the roof frame. The coupling mechanism is designed as a crank-rocker mechanism which raises the lamella away from the roof frame into the use position, and lowers the lamella onto the roof frame into the non-use position, in a substantially parallel fashion.

9 Claims, 3 Drawing Sheets

DRIVE FOR MOVING A WIND DEFLECTOR ON A CABRIOLET

CROSS-REFERENCE TO RELATED APPLICATIONS

This application is a U.S. National Phase of PCT International Application No. PCT/EP2007/003790, filed on Apr. 28, 2007, which claims priority under 35 U.S.C. §119 to German Application No. 10 2006 023 912.1, filed May 19, 2006, the entire disclosures of which are expressly incorporated by reference herein.

BACKGROUND AND SUMMARY OF THE INVENTION

The invention relates to a drive for moving a wind deflector which is designed as a lamella, comprising at least one coupling mechanism by which the lamella can be adjusted from a non-use position into a use position and vice versa and which is articulatedly connected at one end to the lamella and at the other end to the roof frame.

To avoid air draft and turbulence, wind deflectors are often provided on cabriolets. To adapt to different operating conditions, for example driving with an open or closed top, said wind deflector may be designed to be adjustable.

German Patent Publication No. 10 2004 027 087 A1 describes a device for reducing draft in a cabriolet, in which device a wind guiding element is deployed in a speed-dependent fashion. The deployment takes place, however, in a pivoting movement, in which the angle of the wind guiding element varies, which is disadvantageous in terms of aerodynamics.

German Patent Publication No. 10 2004 017 642 A1 describes a device for actuating a wind deflector for a roof opening, with an articulated lever arrangement, which is designed as a scissor arm unit, being provided which moves the wind deflector from a stowage or non-use position, in which the wind deflector is arranged substantially parallel to the roof opening, into an operating or use position in which the wind deflector extends at an angle with respect to the roof opening. Here, the levers of the articulated lever arrangement extend substantially in the vehicle transverse direction.

It is an object of the invention to specify a drive for a lamellar wind deflector, which drive is of particularly simple and reliable design.

The drive according to the invention serves to move a lamella of a wind deflector on a cabriolet. For this purpose, the drive comprises a coupling mechanism, which is designed as a crank-rocker mechanism and which raises the lamella away from the roof frame in a substantially parallel fashion into the use position, and sets the lamella down on the roof frame into the non-use position. A crank-rocker mechanism (also referred to as crank rocker or crank mechanism or crank-rocker drive) permits a simple and reliable and also precise sliding, and therefore retraction and deployment, of the lamella in the direction of one of its surface normals, with the spacing of the lamella to a roof frame being reduced or increased in such a way that the lamella is raised obliquely forward and upward in a parallel fashion, and is moved obliquely rearward and downward in a parallel fashion. Here, the crank-rocker drive according to the invention converts rotary movements into rectilinear movements.

In this way, the lamella can be moved in a substantially parallel fashion instead of pivoting.

Depending on the embodiment, that drive may be manual or electric, manual examples including a hand drive or a foot drive, or electric examples including a machine or motor drive, to engage on the crank-rocker mechanism.

In a further embodiment, a plurality of rotary levers, which are designed as setting-out levers and/or drive levers, of the crank-rocker mechanism are arranged so as to be distributed in the width direction of the lamella.

The drive expediently engages on at least one of the drive levers. For this purpose, the rotary lever, which is designed as a drive lever, is arranged with a first rotary lever end so as to be rotatable about a lamella axle. The rotary lever is mounted at a second rotary lever end so as to be rotatable about a roof frame axle which is arranged on the roof frame and which is parallel to the lamella axle. The rotary lever has a slot which extends in a direction from the first rotary lever end to the second rotary lever end. A driven crank arm is provided which has a first crank arm end and a second crank arm end. At its first crank arm end, the crank arm is mounted so as to be rotatable about a crank arm axle which lies substantially parallel to the roof frame axle and which is arranged on the roof frame. At its second crank arm end, the crank arm has a rotationally symmetrical first pin which engages into the slot.

In a first embodiment, two rotary levers are provided, with the drive engaging on a rod mechanism which connects the crank arm axles of the two drive levers to one another. In this way, the two drive levers are caused to move in a positively synchronized fashion. For an extremely space-saving and simple arrangement of the drive, the drive levers are connected to one another at the frame side by means of the rod mechanism.

During operation of the crank-rocker mechanism, the drive engages on the crank arm of at least one of the drive levers in such a way that the lamella can be moved into the non-use position close to the roof frame by virtue of the relevant crank arm being rotatable such that the first pin assumes a position in the slot in the vicinity of the first rotary lever end. The lamella can be moved into the use position at a maximum distance from the roof frame by virtue of the crank arm being rotatable such that the first pin assumes a position in the slot in the vicinity of the second rotary lever end. In this way, the lamella can be moved at least in a direction of a surface normal of the lamella. The lamella is therefore moved in a parallel fashion. A slight movement component in a longitudinal or transverse direction likewise takes place.

In one preferred embodiment, in the use position, the crank arm assumes such a position with respect to the drive lever that a line, which lies parallel to the crank arm and which connects the crank arm axle and the first pin, is substantially perpendicular to a line which runs in a longitudinal direction of the slot. In this way, the lamella is locked in the use position such that it cannot leave said use position as a result of external forces without the crank arm being rotated in the opposite direction.

For stabilization, in the use position, the rotary lever which is designed as a drive lever is preferably supported on a second pin which is arranged on the crank arm in such a way that said second pin, in the use position, lies at an angle between the first line and the second line, such that the rotary lever abuts against the second pin.

In contrast to the drive lever, the setting-out lever does not have a crank arm. The rotary lever is articulatedly connected directly to the frame. In a simple embodiment, the rotary lever may be formed without a slot or groove.

At least one of the rotary levers, which are designed as setting-out levers and/or drive levers, can preferably be locked in the non-use position by a locking device, such that the lamella cannot be released from the non-use position as a result of relative wind or other influences. Such a locking device preferably comprises a spring-loaded bolt which engages laterally in a suitable way into the rotary lever in order to lock it.

The locking device is preferably actuated by Bowden cable. The locking device can in particular be actuated by an idle stroke of the crank arm when the latter is in the non-use position.

The lamella axles preferably lie substantially in the direction of a longitudinal extent of the lamella, which is arranged in the width direction or transverse direction of a vehicle. It is ensured in this way that the lamella is moved only in the direction of the normal to its surface and in the longitudinal direction of the vehicle.

In a first preferred embodiment, at least three rotary levers are provided, with the lamella axles of at least two rotary levers lying in a first alignment and with the associated roof frame axles lying in a second alignment. Said rotary levers serve as setting-out links or setting-out levers. The lamella axle of the third rotary lever lies in a third alignment which is spaced apart from the first alignment, and the associated roof frame axle lies in a fourth alignment which is spaced apart from the second alignment. Said third rotary lever serves as a drive link or drive lever and has a crank arm which is driven by a drive means. Each rotary lever lies parallel to each other rotary lever. In this way, as viewed from one end of the lamella, a parallelogram is formed by the roof frame and the lamella which lies parallel thereto and the rotary levers which lie parallel to one another. The lamella is thereby prevented from tilting.

In another particularly preferred embodiment, two rotary levers, whose lamella axles lie in a first alignment, with in each case one locking device are arranged in the vicinity of in each case one end of the lamella. Said rotary levers serve merely as setting-out levers and have no crank arm. The rotary levers which serve as setting-out levers are fastened, at the lamella side and at the frame side, in a pivotable fashion to the roof frame by means of the rotary lever. Furthermore, two rotary levers, whose lamella axles lie in the third alignment, are arranged in each case in a central region, which is spaced apart from the ends of the lamella, of the lamella, and are provided with crank arms. In other words: two inner, active rotary levers, which can be moved by a mechanical or electric drive, and two outer, passive rotary levers, which serve in particular for locking in one of the end positions, are provided for the substantially parallel guidance of the lamella away from the roof frame or toward the roof frame, and therefore for a linear setting-out movement. In the simplest embodiment, three rotary levers, for example two setting-out levers (also referred to as guide and locking levers) and one drive lever, are sufficient. The number of—active and/or passive—rotary levers provided is determined for example by the length and shape of the lamella which is to be deployed or raised.

Other objects, advantages and novel features of the present invention will become apparent from the following detailed description of one or more preferred embodiments when considered in conjunction with the accompanying drawings.

BRIEF DESCRIPTION OF THE DRAWINGS

Corresponding parts are provided with the same reference symbols in all the figures.

DETAILED DESCRIPTION

Figure 1:
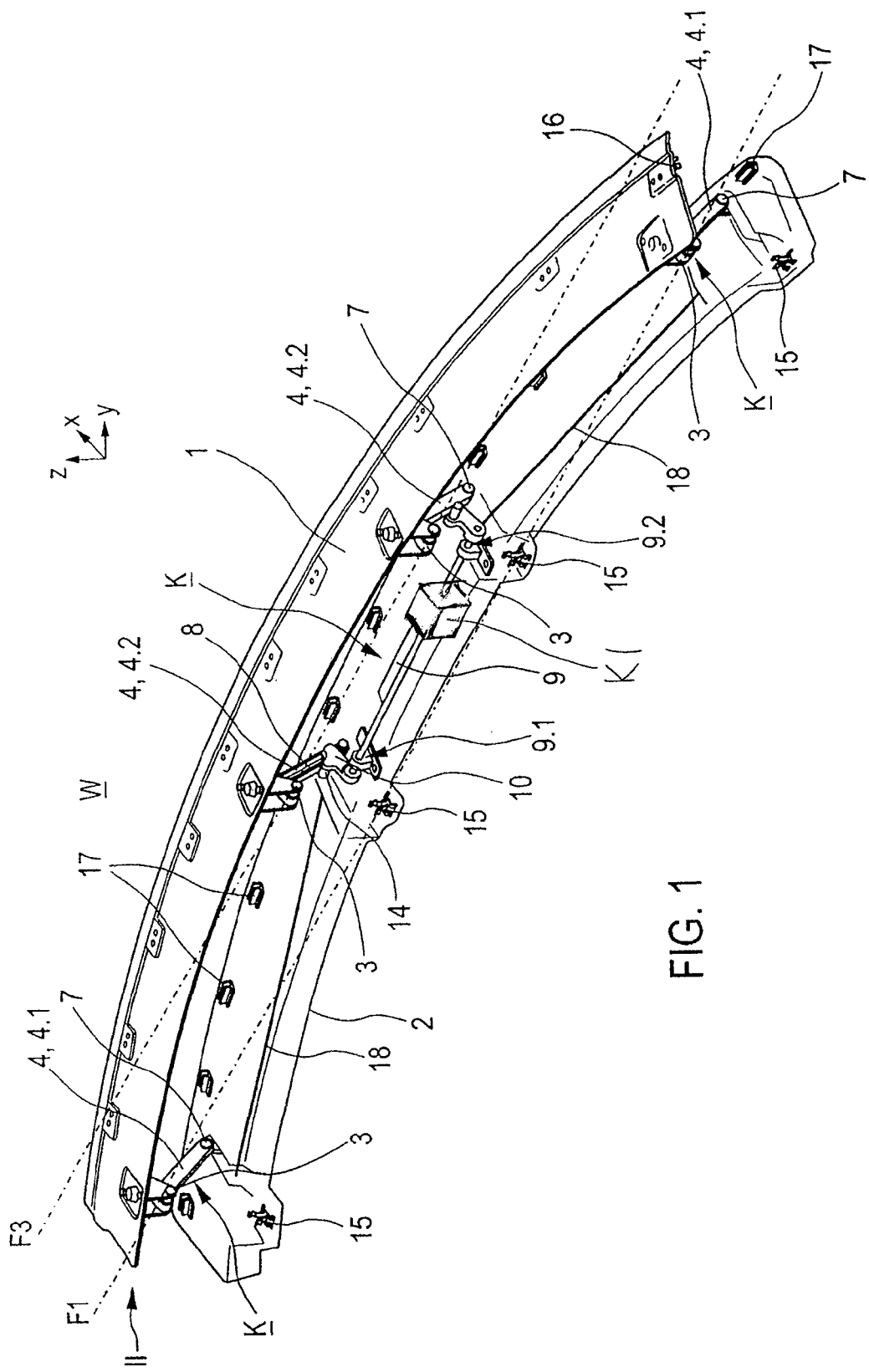
FIG. 1 shows a perspective view of a lamella, which serves as a wind deflector, with a drive, which is designed as a crank-rocker drive, with a plurality of rotary levers for moving the lamella in accordance with an embodiment of the present invention.

FIG. 1 shows a perspective view of a lamella 1 with a coupling mechanism, which is designed as a crank-rocker mechanism K, for moving the lamella 1 from a non-use position I into a use position II. The lamella 1 is arranged on a roof frame 2, for example the roof frame of a cabriolet. The lamella 1 serves for example as a wind deflector W which deflects the air flowing approaching a vehicle interior space, in such a way that turbulence and air flows are largely prevented from flowing into the vehicle interior space.

The lamella 1 has a curvature which runs in particular over the entire vehicle width. In order to deploy and retract a lamella 1 which is curved in this way linearly into a position parallel to the roof frame 2 in a simple manner, the crank-rocker drive K comprises a plurality of rotary levers 4 which are arranged so as to be distributed along the width direction y of the lamella 1, which rotary levers 4 are arranged parallel to one another and are designed as setting-out levers 4.1 and rotary levers 4.2 which are explained in more detail below.

Four rotary levers 4 are provided on the lamella 1, two of which rotary levers 4 serve as setting-out levers 4.1 (also referred to as outer rotary levers) and are arranged in the vicinity of in each case one end of the lamella 1. Two further rotary levers 4 serve as drive levers 4.2 (also referred to as inner levers) and are arranged in a central region of the lamella 1. The drive levers 4.2 in the central region have driven crank arms 10 which are described in more detail in FIGS. 1 and 2 and whose crank arm axles 9.1 and 9.2 are connected to one another by means of a rod mechanism 9. That is to say, the inner drive levers 4.2 are actively driven via the rod mechanism 9 by means of a drive means (not illustrated in any more detail; schematically illustrated as drive K1), for example electrically by an electric motor or mechanically by a foot drive or hand drive. Alternatively, the drive may engage only on one of the drive levers 4.2.

The outer setting-out levers 4.1 are of passive design and serve for the linear setting-down and setting-out movement of the lamella 1 and for locking said lamella 1 in one of its end positions I or II.

The rod mechanism 9 and the crank arm axles 9.1, 9.2 are arranged and held in a rotatable fashion on the roof frame 2. The respective crank arm 10 of the drive lever 4.2 is fastened to the rotatable crank arm axle 9. Alternatively, the respective crank arm 10 may also be arranged in a rotatable fashion on the associated crank arm axle 9.

By rotating the rod mechanism 9, the crank arm axles 9.1, 9.2 and therefore the crank arm 10 are set in rotational motion, which crank arm 10, by the linear guidance of a first pin 13 in a slot 8 of the respective drive lever 4.2, converts the resulting rotational movement into a linear movement of the lamella 1.

In the exemplary embodiment shown, the outer setting-out levers 4.1 in the vicinity of the ends of the lamella 1 are not driven, and therefore no crank arm 10 is provided here. The slot 8 may be dispensed with here. For the purpose of simpler production, however, it would be possible to use rotary levers 4 with slots 8 here too.

The lamella axles 3 of the two outer setting-out levers 4.1 lie in a first alignment F1. The roof frame axles 7 of the outer setting-out levers 4.1 lie in a second alignment. The lamella axles 3 of the two inner drive levers 4.2 lie in a third alignment F3 which is spaced apart from the first alignment F1. The roof frame axles 7 of the inner drive levers 4.2 lie in a fourth alignment which is spaced apart from the second alignment F2. For clarity, only the alignments F1 and F3 are illustrated in FIG. 1. Each rotary lever 4.1, 4.2 lies parallel to each other rotary lever 4.1, 4.2. In this way, as viewed from one end of the lamella 1, a parallelogram is formed with the roof frame axles 7 and the lamella axles 3 as corner points. The lamella 1 is thereby prevented from tilting, regardless of which of the two end positions I, II it is situated in or whether it is in an intermediate position.

Retaining clamps, for example, are provided on the roof frame 2 as a locking device 15, into which retaining clamps the lamella axles 3 slide in the non-use position I such that they are held there and the lamella 1 does not inadvertently leave the non-use position I as a result of relative wind or other forces. Further retaining devices 16 are provided on the front edge of the lamella 1 for this purpose, the counterparts 17 of which retaining devices 16 are arranged on the roof frame 2.

In order to fix the lamella 1 in the non-use position I, it is possible for other suitable locking devices to be provided in particular on the outer setting-out levers 4.1 but also on the inner drive levers 4.2. One possible locking device preferably comprises, on each setting-out lever 4.1, a spring-loaded bolt (not illustrated) which engages laterally in a suitable way into the setting-out lever 4.1 in order to lock the latter. The bolt is actuated for example by a Bowden cable 18 which is arranged on a crank arm 10 of the drive lever 4.2 in such a way that the bolt locks the setting-out lever 4.1 when the crank arm 10 is in the non-use position I and performs an idle stroke.

As an alternative to the slot 8 of the respective drive lever 4.2, it is possible for a groove to be provided. The slot 8 or groove may also be of curved design.

Figure 2:
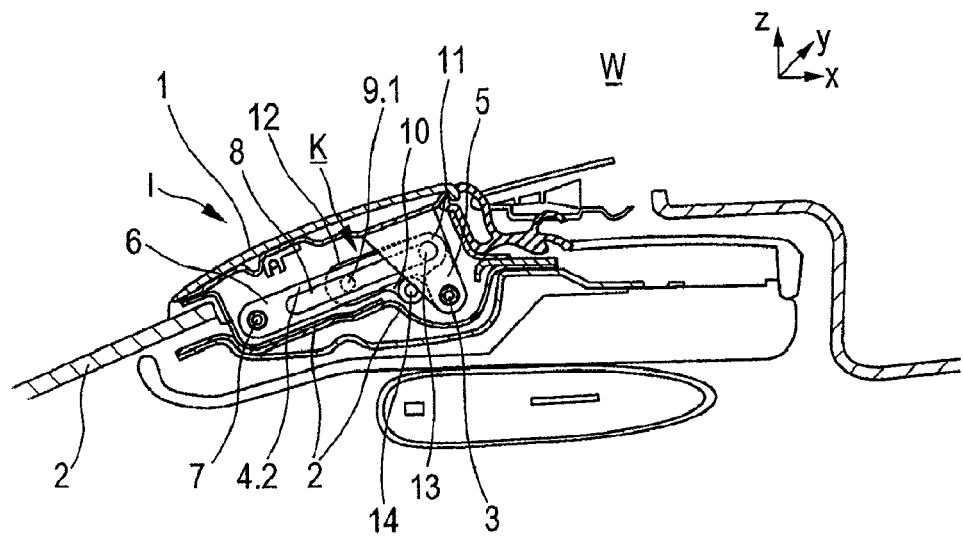
FIG. 2 shows a section illustration of a rotary lever, which is designed as a drive lever, in the retracted state in a non-use position in accordance with an embodiment of the present invention.

FIG. 2 shows a section view through a wind deflector W in the region of a drive lever 4.2. The roof frame 2 may, as shown in FIG. 2, comprise a multiplicity of individual parts, the design of which is however not essential to the invention.

The lamella axle 3 of the drive lever 4.2 is arranged on the lamella 1, which lamella axle 3 lies parallel to the lamella 1 and is aligned substantially in the width direction y of the latter. For a substantially linear displacement of the lamella 1 in the direction of its surface normal z, the drive lever 4.2 is designed as a crank-rocker mechanism. The drive lever 4.2 is explained in more detail below:

The drive lever 4.2 is arranged, at a first rotary lever end 5, so as to be rotatable about the lamella axle 3. At a second rotary lever end 6 of the drive lever 4.2, the latter is mounted so as to be rotatable about a roof frame axle 7 which is arranged on the roof frame 2 and which is parallel to the lamella axle 3.

The drive lever 4.2 has a slot 8 which extends substantially in a direction from the first rotary lever end 5 to the second rotary lever end 6.

A crank arm axle 9.1 is also arranged on the roof frame 2, which crank arm axle 9.1 lies parallel to the roof frame axle 7.

A crank arm 10 is mounted at a first crank arm end 11 so as to be rotatable about the crank arm axle 9.1. The crank arm 10 or the crank arm axle 9.1 is provided, via the rod mechanism 9, with a drive means, for example with an electric motor, in a way not shown here. The crank arm axle 9.1 points in the direction of the viewer of the figure, and does not extend through the slot 8.

At a second crank arm end 12, the crank arm 10 has a rotationally symmetrical first pin 13 which engages into the slot 8. Furthermore, a second pin 14 is provided whose arrangement and function will become clear in FIG. 3. In FIG. 2, the lamella 1 is situated in a non-use position I close to the roof frame 2. For this purpose, the crank arm 10 is rotated by its drive means via the crank arm axle 9.1 in such a way that the first pin 13 assumes a position in the slot 8 in the vicinity of the first rotary lever end 5.

Figure 3:
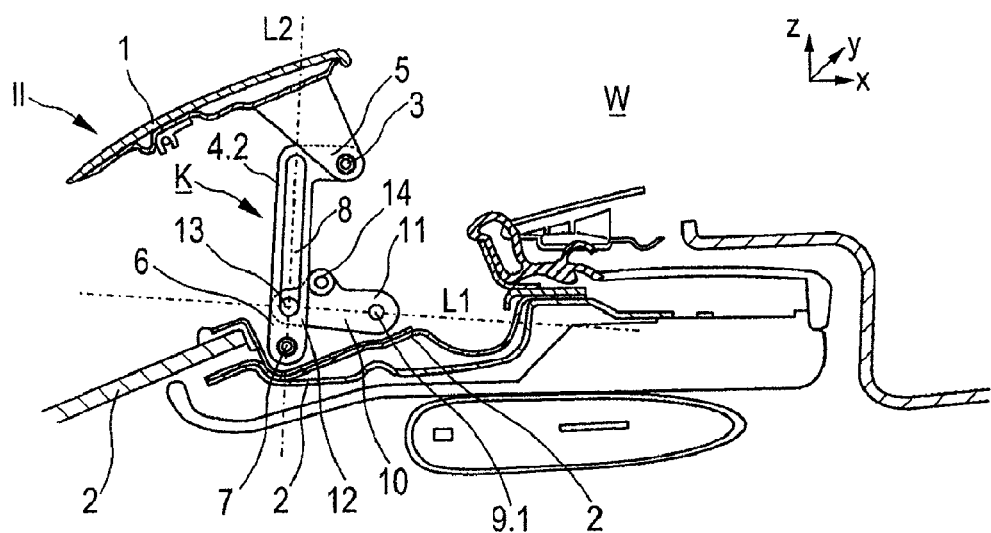
FIG. 3 shows a section illustration of a rotary lever, which is designed as a drive lever, in the deployed state in a use position in accordance with an embodiment of the present invention.

FIG. 3 shows the wind deflector W from FIG. 2 with the drive lever 4.2 in a section illustration, with the lamella 1 being situated in a use position II at a maximum distance from the roof frame 2.

For this purpose, the crank arm 10 or the crank arm axle 9.1 has been rotated counterclockwise out of the position shown in FIG. 2, such that the first pin 13 slides in the slot 8 into the vicinity of the second rotary lever end 6. Here, the drive lever 4.2 is pushed upward in such a way that the lamella 1 moves in the direction of a normal to its surface. Here, a movement of the lamella 1 to the left in the drawing inevitably likewise takes place.

In the use position II, the crank arm 10 assumes such a position with respect to the drive lever 4.2 that a first line L1, which lies parallel to the crank arm 10 and connects the crank arm axle 9.1 and the first pin 13, is approximately perpendicular to a second line L2, which runs in a longitudinal direction of the slot 8. In this way, the lamella 1 is locked in the use position II, such that said lamella 1 can only leave the use position II as a result of a renewed, opposite rotation of the crank arm 10.

Furthermore, in the use position II, the drive lever 4.2 is supported on the second pin 14, which is arranged on the crank arm 10 such that, in the use position II, said second pin 14 lies at an angle between the first line L1 and the second line L2, such that the drive lever 4.2 abuts against said second pin 14.

Figure 4:
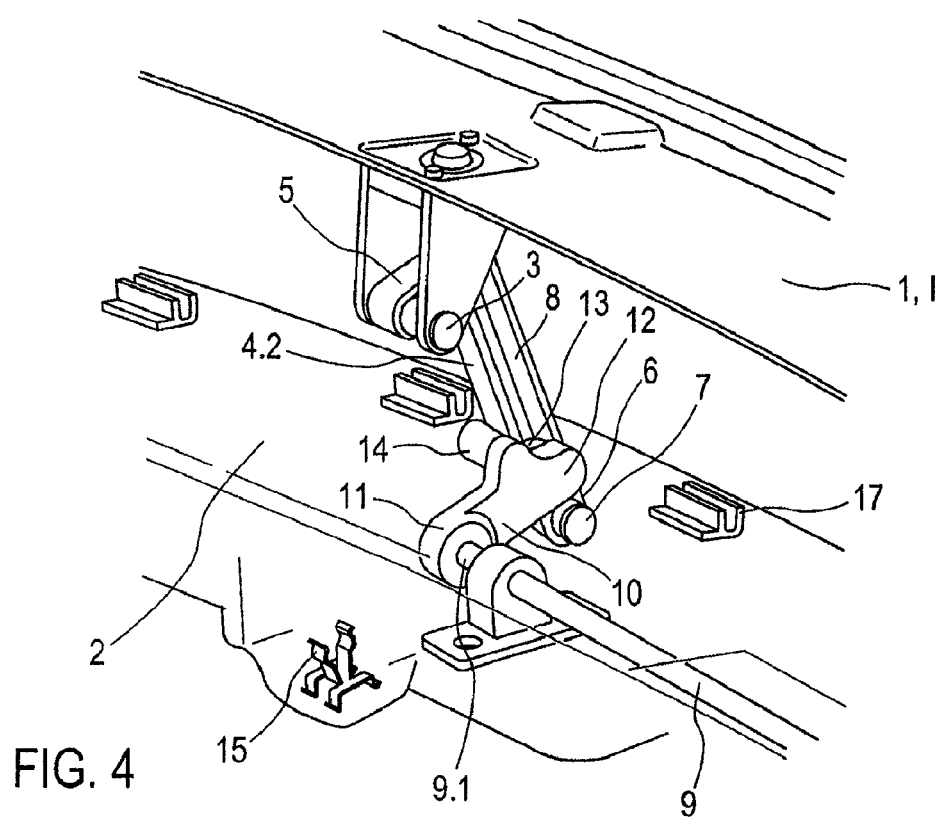
FIG. 4 shows a perspective illustration of a drive lever in a use position, in accordance with an embodiment of the present invention
Figure 5:
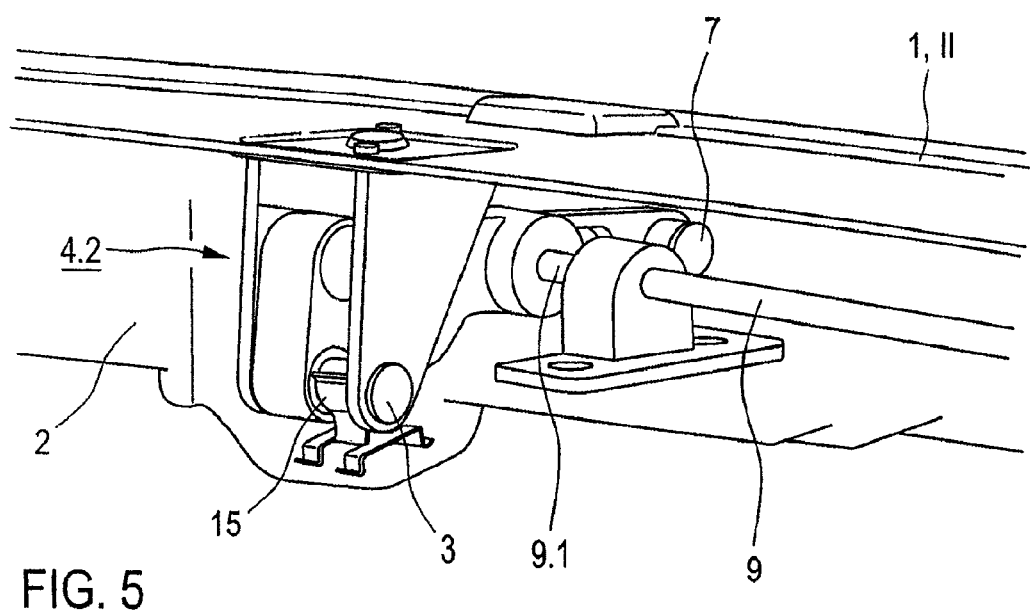
FIG. 5 shows a perspective illustration of a drive lever in a non-use position in accordance with an embodiment of the present invention.

FIGS. 4 and 5 show in each case one of the rotary levers 4.2 in a perspective illustration in the deployed state (FIG. 4) and in the retracted state (FIG. 5).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A drive for moving a wind deflector which is designed as a lamella, comprising:
   at least one coupling mechanism, wherein
      the at least one coupling mechanism adjusts the lamella between a non-use position and a use position,
      the at least one coupling mechanism is articulatedly connected at one end to the lamella and at the other end to a roof frame, and
      the coupling mechanism is a crank-rocker mechanism which raises the lamella away from the roof frame in a substantially parallel fashion into the use position, and lowers the lamella onto the roof frame into the non-use position, further wherein
- a manual drive or an electric drive engages the crank-rocker mechanism,
- the crank-rocker mechanism comprises at least two rotary levers which are distributed in a width direction of the lamella and which are at least one of setting-out levers and drive levers, and the drive engages on at least one of the drive levers,
- a rotary lever which is a drive lever is mounted at a first rotary lever end so as to be rotatable about a lamella axle on the lamella and at a second rotary lever end so as to be rotatable about a roof frame axle which is arranged on the roof frame and which is parallel to the lamella axle,
- the rotary lever has a slot or a groove which extends substantially in a direction from the first rotary lever end to the second rotary lever end, and
- a crank arm having a first crank arm end and a second crank arm end, the crank arm at the first crank arm end being arranged on a rotatable crank arm axle which lies substantially parallel to the roof frame axle arranged on the roof frame, and the crank arm at the second crank arm end having a rotationally symmetrical first pin which engages into the slot or the groove.

2. The drive as claimed in claim 1, wherein
the drive engages on a rod mechanism which connects crank arm axles of two rotary drive levers to one another.

3. The drive as claimed in claim 2, wherein
the rotary drive levers are connected to one another at a roof frame side by the rod mechanism.

4. The drive as claimed in claim 3, wherein
the drive engages on the crank arm of at least one of the rotary drive levers, such that the lamella is movable into the non-use position close to the roof frame by rotation of the respective crank arm, such that a first pin assumes a position in a slot or in a groove in the vicinity of the first rotary lever end, and
the lamella is movable into the use position at a maximum distance from the roof frame by rotation of the crank arm such that the first pin assumes a position in the slot or in the groove in the vicinity of the second rotary lever end.

5. The drive as claimed in claim 4, wherein
in the use position, the crank arm assumes a position with respect to the drive lever such that a first line, which lies parallel to the crank arm and which connects the crank arm axle and the first pin, is substantially perpendicular to a second line which runs in a longitudinal direction of the slot or of the groove.

6. The drive as claimed in claim 5, wherein
a second pin is provided on the crank arm, and
when in the in use position, the second pin lies at an angle between the first line and the second line such that the rotary lever abuts against the second pin.

7. The drive as claimed in claim 6, wherein
at least one of the rotary levers, which are at least one of setting-out levers and drive levers, is lockable in the non-use position by a locking device.

8. The drive as claimed in claim 7, wherein
at least three rotary levers are provided, with
- the lamella axles of at least two rotary levers designed as setting-out levers and lying in a first alignment with the associated roof frame axles lying in a second alignment,
- the lamella axles of at least one third rotary lever designed as a drive lever lying in a third alignment which is spaced apart from the first alignment of the other rotary levers with the associated roof frame axle lying in a fourth alignment which is spaced apart from the second alignment, and
- each rotary lever lying parallel to each other rotary lever.

9. The drive as claimed in claim 8, wherein
the two rotary levers which are designed as setting-out levers and whose lamella axles lie in the first alignment in each case are associated with one locking device arranged in the vicinity of each end of the lamella, and
two rotary levers, which are designed as drive levers and whose lamella axles lie in the third alignment are arranged in a central region spaced apart from the ends of the lamella, are provided with the crank arms whose crank arm axles are acted on by the drive.

* * * * *